United States Patent
Takahashi

(10) Patent No.: US 9,042,839 B2
(45) Date of Patent: May 26, 2015

(54) MOBILE COMMUNICATION TERMINAL TEST SYSTEM AND MOBILE COMMUNICATION TERMINAL TEST METHOD

(71) Applicant: ANRITSU CORPORATION, Kanagawa (JP)

(72) Inventor: Hayato Takahashi, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 105 days.

(21) Appl. No.: 14/054,096

(22) Filed: Oct. 15, 2013

(65) Prior Publication Data

US 2014/0128003 A1 May 8, 2014

(30) Foreign Application Priority Data

Nov. 7, 2012 (JP) ................................ 2012-245416

(51) Int. Cl.
*H04B 17/00* (2006.01)
*H04W 24/00* (2009.01)
*H04W 24/06* (2009.01)
*H04L 12/24* (2006.01)
*H04L 12/26* (2006.01)

(52) U.S. Cl.
CPC ............... *H04W 24/06* (2013.01); *H04B 17/10* (2013.01); *H04L 41/145* (2013.01); *H04L 43/50* (2013.01)

(58) Field of Classification Search
USPC ......................................... 455/67.7, 423, 424
See application file for complete search history.

(56) References Cited

U.S. PATENT DOCUMENTS

| | | | |
|---|---|---|---|
| 7,263,355 B2 | 8/2007 | Morikawa et al. | |
| 8,346,281 B2 * | 1/2013 | Noonan et al. ............. | 455/456.1 |
| 2013/0085737 A1 * | 4/2013 | Hashimoto et al. ............. | 703/13 |
| 2014/0204912 A1 * | 7/2014 | Tanaka et al. ................. | 370/335 |

FOREIGN PATENT DOCUMENTS

| | | |
|---|---|---|
| JP | 2005-012274 A | 1/2005 |
| JP | 2009-147640 | 7/2009 |

* cited by examiner

*Primary Examiner* — Quochien B Vuong
(74) *Attorney, Agent, or Firm* — Pearne & Gordon LLP

(57) ABSTRACT

The present invention relates to a test system for displaying log information about the communication of a plurality of pseudo-base stations such that each pseudo-base station can be identified. A mobile communication terminal test system includes a display device which is connected to a plurality of pseudo-base station apparatuses through a network, receives a packet transmitted from each of the plurality of pseudo-base station apparatuses, and displays a communication log between layers on a display unit on the basis of log data included in the packet. The display device includes an information storage unit that stores information associated with the address of each of the plurality of pseudo-base station apparatuses in advance and a log data storage unit that stores the log data such that the pseudo-base station apparatus which has performed the communication can be identified.

10 Claims, 9 Drawing Sheets

| IP address | TCP/IP port number | BTS identification information |
|---|---|---|
| 192.168.0.1 | 8012 | 1 |
| 192.168.0.2 | 8012 | 2 |

FIG. 2

| Log header | Inter-layer communication data |
|---|---|

| ID | Time information | Transmission source layer | Destination layer | Channel information | Primitive name | Log data length |
|---|---|---|---|---|---|---|

FIG. 3

| Log header | Inter-layer communication data |
|---|---|

| BTS identification information | ID | Time information | Transmission source layer | Destination layer | Channel information | Primitive name | Log data length |
|---|---|---|---|---|---|---|---|

FIG. 4

| IP address | TCP/IP port number | Distribution destination |
|---|---|---|
| 192.168.0.1 | 8012 | Storage unit #1 |
| 192.168.0.2 | 8012 | Storage unit #2 |

FIG.10

| Read source | BTS identification information |
|---|---|
| Storage unit #1 | 1 |
| Storage unit #2 | 2 |

FIG.11

MOBILE COMMUNICATION TERMINAL TEST SYSTEM AND MOBILE COMMUNICATION TERMINAL TEST METHOD

TECHNICAL FIELD

The present invention relates to a mobile communication terminal test system which can check the state of communication between a pseudo-base station and a mobile communication terminal capable of communicating with a base station on the basis of the same communication standard or different communication standards and store and display communication log information during the communication, and a method of displaying log information in the test system.

BACKGROUND ART

For example, when a new mobile communication terminal, such as a portable terminal apparatus, is developed, it is necessary to check whether the mobile communication terminal, which is currently under development, communicates properly with a base station. However, it is difficult to connect the mobile communication terminal, which is currently under development, to the actual base station and test the operation of the mobile communication terminal.

Therefore, the mobile communication terminal, which is currently under development, is connected to a pseudo-base station having the same function as the actual base station and various kinds of communication information are transmitted and received between the mobile communication terminal and the pseudo-base station to test whether the mobile communication terminal operates normally.

In the test, communication is performed between the mobile communication terminal and the pseudo-base station on the basis of a predetermined communication protocol and a communication sequence, and the log information of the content of the communication are acquired. When the mobile communication terminal does not operate normally, the cause of the abnormal operation is investigated on the basis of the log information. Patent Document 1 discloses this type of test device.

In order to perform communication with a communication terminal which is a test target, the test device disclosed in Patent Document 1 includes a control unit which controls a communication sequence, a protocol stack which controls a hierarchized communication protocol in communication and extracts a communication sequence, communication content, and time information as log information, a log acquisition unit which acquires the log information extracted by the protocol stack, a main storage unit which stores the log information acquired by the log acquisition unit, a display unit which displays the log information stored in the main storage unit, a temporary storage unit which sequentially stores the log information acquired by the log acquisition unit for a predetermined period, and a setting unit which sets conditions for selectively extracting a portion of the log information from the temporary storage unit. The control unit detects the log information satisfying the conditions from the temporary storage unit on the basis of the conditions set by the setting unit and stores the detected log information and at least one of the log information items immediately before and after the detected log information in the main storage unit.

According to this structure, in order to perform a performance evaluation test for a communication terminal, such as a mobile telephone or a mobile terminal, the test device disclosed in Patent Document 1 can communicate with the communication terminal and store various kinds of information, such as log information or measured data, during communication.

In the actual communication system, when the mobile communication terminal moves, handover is performed in which communication between the mobile communication terminal and the base station is switched by the same communication system or inter-RAT is performed in which communication between the mobile communication terminal and the base station is switched by different communication systems (hereinafter, handover and inter-RAT are collectively referred to as handover). Patent Document 2 discloses this type of test device.

The test device disclosed in Patent Document 2 includes a connection portion that can connect two terminal apparatuses based on the same communication system or different communication systems, first and second terminal control means that are connected to a common bus, receive a program and a measurement instruction corresponding to the communication system, and execute the received program and measurement instructions to output test signals including a signal for controlling the terminal apparatuses which can be connected to the connection portion, a measurement unit that is connected to the common bus, receives a response signal from each of the terminal apparatuses which have responded to the test signals from the first and second terminal control means, and measures the conditions determined by the measurement instruction, and total control means for supplying a program corresponding to the communication system of the terminal apparatus to the first and second terminal control means through the common bus in advance and outputting the measurement instruction to the first and second terminal control means through the common bus.

According to this structure, it is possible to appropriately select various types of measurements, such as the parallel measurement of a plurality of communication systems and a plurality of terminal apparatuses, the parallel measurement of measurement items, and the measurement of handover having timing as an important factor and to perform the selected measurement.

RELATED ART DOCUMENT

Patent Document

[Patent Document 1] JP-A-2009-147640
[Patent Document 2] JP-A-2005-12274

DISCLOSURE OF THE INVENTION

Problem that the Invention is to Solve

In the test for the mobile communication terminal according to the related art, in some cases, it is difficult for a single test device which includes a plurality of pseudo-base stations and performs, for example, a handover test to merge and display the logs of the plurality of pseudo-base stations.

For example, a test device corresponding to a new communication system (for example, LTE-Advanced at the present time) whose communication standard is being decided requires a higher processing capacity than the communication system according to the related art and needs to have a structure which can cope with pieces in the communication standard that are decided in the future. Therefore, in some cases, a circuit size or the size of the structure of a device increases and it is difficult to provide a plurality of pseudo-base stations in a single test device.

It is assumed that the inter-RAT test is performed between various communication systems. However, in some cases, it is difficult for one test device to correspond to all communication systems.

In this case, for example, when the handover test is performed, a test system is considered in which a plurality of test devices are used as pseudo-base stations and a display device acquires a communication log with a mobile communication terminal from each of the plurality of test devices and displays the communication log.

However, each test device does not assume this structure, and the communication log which is transmitted from the test device to the display device does not include information for identifying each test device (that is, each pseudo-base station). Therefore, when the display device merges the logs of the plurality of pseudo-base stations during the display of the communication log, it is difficult to distinguish the logs of the pseudo-base stations.

In order to solve the above-mentioned problems, an object of the invention is to provide a mobile communication terminal test system including a plurality of pseudo-base stations and a mobile communication terminal test method which can appropriately collect log information about the operation of each of the plurality of pseudo-base stations while distinguishing the log information and display the log information about the operation of each of the plurality of pseudo-base stations such that the pseudo-base stations can be identified.

Means for Solving the Problem

According to a first aspect of the invention, a mobile communication terminal test system (100, 900) includes a plurality of pseudo-base station apparatuses (51, 52) each of which simulates an operation of a base station, communicates with a mobile communication terminal (70), which is a test target in accordance with a communication protocol including a plurality of layers, performs a process of each of the plurality of layers during the communication, generates log data including communication data between the layers, and transmits a packet including the log data and a display device (10) that is connected to the pseudo-base station apparatuses through a network, receives the packet transmitted from each of the pseudo-base station apparatuses, and displays a communication log between the layers on a display unit (11) on the basis of the log data included in the packet. The display device includes an information storage unit (16, 22) that stores information associated with an addresses of each of the plurality of pseudo-base station apparatuses on the network in advance, a log data storage unit (13, 31, 32) that stores the log data such that the pseudo-base station apparatus which has performed the communication can be identified on the basis of the information stored in the information storage unit, and a display control unit (12) that displays the log on the display unit such that the pseudo-base station apparatus which has performed the communication can be identified, on the basis of the log data stored in the log data storage unit.

According to this structure, the mobile communication terminal test system according to the first aspect of the invention can display log information about the operation of each of the plurality of pseudo-base stations such that each of the pseudo-base stations can be identified, even though the log information does not include information for identifying the plurality of pseudo-base stations.

According to a second aspect of the invention, in the mobile communication terminal test system (100), the information storage unit may be a pseudo-base station specification information storage unit (16) that stores pseudo-base station specification information in which identification information for identifying each of the plurality of pseudo-base station apparatuses is associated with the addresses of the plurality of pseudo-base station apparatuses on the network in advance. The display device may further include an identification information addition unit (14) that, when receiving the packet including the log data from each of the plurality of pseudo-base station apparatuses, specifies the pseudo-base station apparatus which has generated the log data with reference to the address of a transmission source of the packet and the pseudo-base station specification information and adds the identification information of the specified pseudo-base station apparatus to the log data. The display control unit may display the log on the display unit such that the pseudo-base station apparatus which has performed the communication can be identified, on the basis of the identification information having the log data added thereto.

According to a third aspect of the invention, in the mobile communication terminal test system (900), the display device may include a plurality of the log data storage units (31, 32) that are provided so as to correspond to the plurality of pseudo-base station apparatuses. The information storage unit may be a distribution information storage unit (22) that stores distribution information in which distribution destination information for specifying each of the plurality of log data storage units is associated with the addresses of the plurality of pseudo-base station apparatuses on the network in advance. The display device may further include a log data distribution unit (20) that, when receiving the packet including the log data from each of the plurality of pseudo-base station apparatuses, specifies the log data storage unit which will store the log data with reference to the address of a transmission source of the packet and the distribution destination information and stores the log data in the specified log data storage unit and a read information storage unit (21) that stores read information in which read source information for specifying each of the plurality of log data storage units is associated with identification information for identifying each of the plurality of pseudo-base station apparatuses in advance. The display control unit may display the log on the display unit such that the pseudo-base station apparatus which has performed the communication can be identified, on the basis of the log data and the read information read from each of the plurality of log data storage units.

According to a fourth aspect, in the mobile communication terminal test system, the display control unit may switch between a state in which the display control unit sorts the log in an order of time indicated by time information which is included in the log data and displays the sorted log and a state in which the display control unit sorts the log for each pseudo-base station apparatus which has performed the communication and displays the sorted log.

According to a fifth aspect, in the mobile communication terminal test system, the plurality of pseudo-base station apparatuses may include a first pseudo-base station apparatus and a second pseudo-base station apparatus. Handover or inter-RAT which changes a communication destination of the mobile communication terminal from the first pseudo-base station apparatus to the second pseudo-base station apparatus may be performed. The display control unit may display the logs of the first pseudo-base station apparatus and the second pseudo-base station apparatus as a series of logs.

According to a sixth aspect, a mobile communication terminal test method includes a step (S11, S31) of allowing a plurality of pseudo-base station apparatuses (51, 52), each of which simulates an operation of a base station, to communicate with a mobile communication terminal (70), which is a test target in accordance with a communication protocol including a plurality of layers, and to perform a process of each of the plurality of layers during the communication, a step (S13, S33) of allowing each of the plurality of pseudo-base station apparatuses to generate log data including communication data between the layers, a step (S14, S34) of allowing each of the plurality of pseudo-base station apparatuses to transmit a packet including the log data, a step (S21, S41) of allowing a display device (10), which is connected to the plurality of pseudo-base station apparatuses through a network, to receive the packet transmitted from each of the pseudo-base station apparatuses, a step (S25, S46) of allowing the display device to display a communication log between the layers on the basis of the log data included in the packet, a step of storing information which is associated with an address of each of the plurality of pseudo-base station apparatuses on the network in advance, and a step (S24, S43) of storing the log data such that the pseudo-base station apparatus which has performed the communication can be identified, on the basis of the information. The display step displays the log such that the pseudo-base station apparatus which has performed the communication can be identified, on the basis of the stored log data.

According to this structure, the mobile communication terminal test method according to the sixth aspect of the invention can display log information about the operation of each of the plurality of pseudo-base stations such that each of the pseudo-base stations can be identified, even though the log information does not include information for identifying the plurality of pseudo-base stations.

According to a seventh aspect of the invention, in the mobile communication terminal test method, the storage step may store pseudo-base station specification information in which identification information for identifying each of the plurality of pseudo-base station apparatuses is associated with the addresses of the plurality of pseudo-base station apparatuses on the network in advance. The test method may further include a step (S22, S23) of, when the display device receives the packet including the log data from each of the plurality of pseudo-base station apparatuses, specifying the pseudo-base station apparatus which has generated the log data with reference to the address of a transmission source of the packet and the pseudo-base station specification information and adding the identification information of the specified pseudo-base station apparatus to the log data. The display step may display the log such that the pseudo-base station apparatus which has performed the communication can be identified, on the basis of the identification information having the log data added thereto.

According to an eighth aspect of the invention, in the mobile communication terminal test method, the storage step may store distribution destination information for specifying each of a plurality of log data storage units (31, 32), which are provided in the display device so as to correspond to the plurality of pseudo-base station apparatuses, and the addresses of the plurality of pseudo-base station apparatuses on the network in advance so as to be associated with each other. The test method may further include a step of storing read source information for specifying each of the plurality of log data storage units and pseudo-base station specification information for specifying each of the plurality of pseudo-base station apparatuses to a read information storage unit in advance so as to be associated with each other and a step (S42, S43) of, when the display device receives the packet including the log data from each of the plurality of pseudo-base station apparatuses, specifying the log data storage unit which will store the log data with reference to the address of a transmission source of the packet and the distribution destination information and storing the log data in the specified log data storage unit. The display step may display the log such that the pseudo-base station apparatus which has performed the communication can be identified, on the basis of the log data which is read from each of the plurality of log data storage units and information stored in the read information storage unit.

According to a ninth aspect of the invention, in the mobile communication terminal test method, the display step may switch between a state in which the log is sorted in an order of time indicated by time information which is included in the log data and the sorted log is displayed and a state in which the log is sorted for each pseudo-base station apparatus which has performed the communication and the sorted log is displayed.

According to a tenth aspect of the invention, in the mobile communication terminal test method, the plurality of pseudo-base station apparatuses may include a first pseudo-base station apparatus and a second pseudo-base station apparatus. Handover or inter-RAT which changes a communication destination of the mobile communication terminal from the first pseudo-base station apparatus to the second pseudo-base station apparatus may be performed. The display step may display the logs of the first pseudo-base station apparatus and the second pseudo-base station apparatus as a series of logs.

Advantage of the Invention

According to the invention, it is possible to provide a mobile communication terminal test system that includes a plurality of pseudo-base stations, can appropriately collect log information about the operation of each of the plurality of pseudo-base stations while distinguishing the log information, and can display the log information about the operation of each of the plurality of pseudo-base stations such that each of the pseudo-base stations can be identified, and a method of displaying log information in the test system.

BRIEF DESCRIPTION OF THE DRAWINGS

FIG. 2 is a diagram illustrating an example of a table stored in a BTS information storage unit of a display device.

FIG. 3 is a diagram illustrating an example of the format of log data transmitted from a pseudo-base station shown in FIG. 2 to the display device.

FIG. 4 is a diagram illustrating an example of the format of log data stored in a log data storage unit of the display device.

FIG. 6(a) is a flowchart illustrating the operation of the pseudo-base station acquiring communication log information between a mobile communication terminal and the pseudo-base station, and FIG. 6(b) is a flowchart illustrating the operation of the display device displaying the communication log information for each pseudo-base station.

FIG. 10 is a diagram illustrating an example of a table which is stored in a distribution information storage unit of a display device of the test system shown in FIG. 9.

FIG. 11 is a diagram illustrating an example of a table which is stored in a read information storage unit of the display device of the test system shown in FIG. 9.

FIG. 12(a) is a flowchart illustrating the operation of a pseudo-base station acquiring communication log information between a mobile communication terminal and the pseudo-base station, and FIG. 12(b) is a flowchart illustrating the operation of the display device displaying the communication log information for each pseudo-base station.

BEST MODE FOR CARRYING OUT THE INVENTION

Hereinafter, a test system 100 according to an embodiment of the invention will be described with reference to the drawings.

Figure 1:
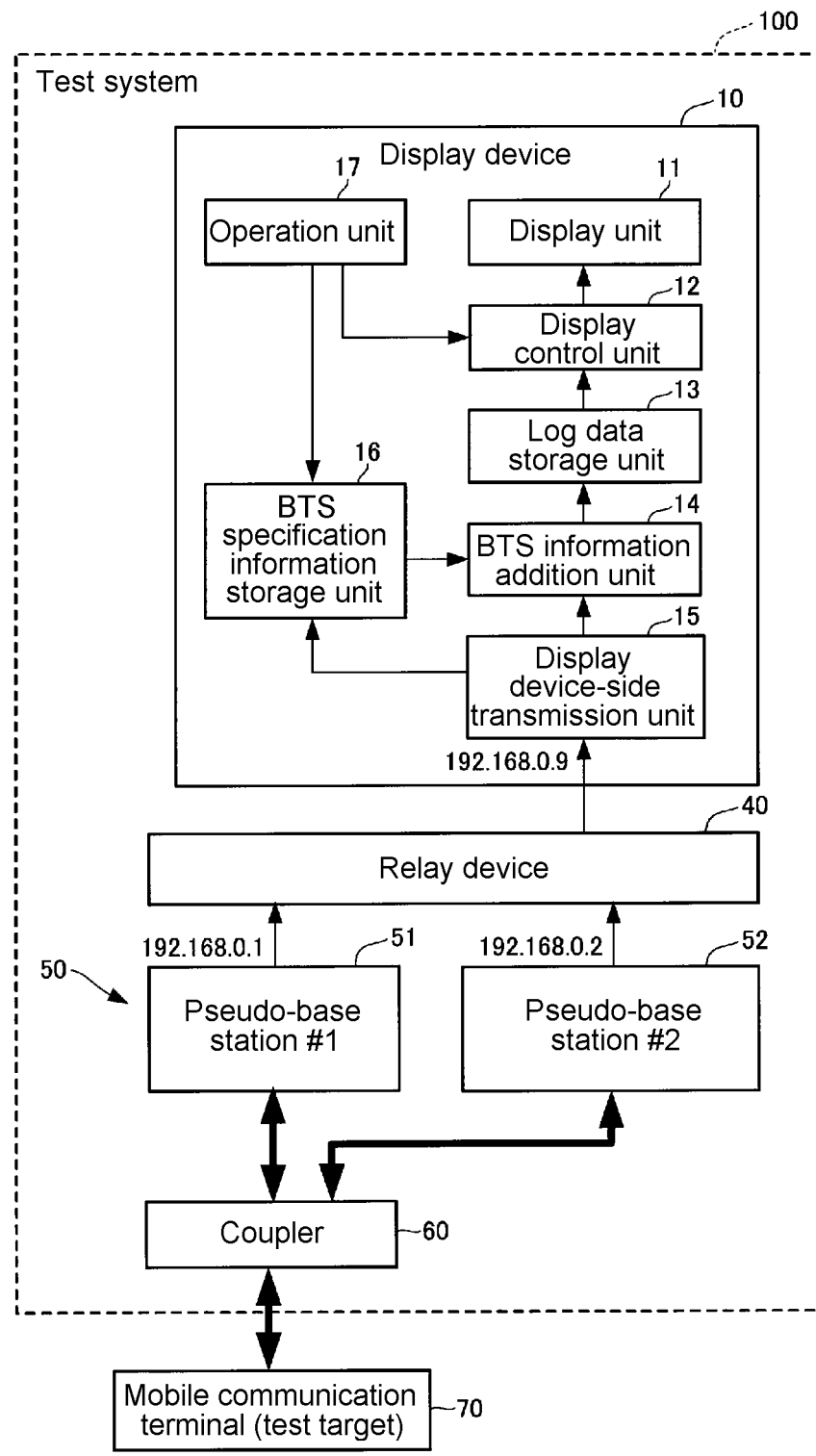
FIG. 1 is a block diagram illustrating a test system according to an embodiment of the invention.

FIG. 1 is a block diagram illustrating the test system 100 according to the embodiment of the invention. The test system 100 includes pseudo-base stations 50 including a pseudo-base station (#1) 51 and a pseudo-base station (#2) 52 which function as test devices.

Here, reference numerals #1 and #2 are used only to distinguish two pseudo-base stations and do not mean a master-and-servant relationship. In addition, the number of pseudo-base stations 50 is not limited to two, and three or more pseudo-base stations may be provided.

In addition, the test system 100 includes a display device 10 for displaying log information about test communication between the pseudo-base stations 51 and 52 and a mobile communication terminal 70.

In the specification, in some cases, the "log information" means only log information about the content of communication or log header information including identification information about the log information or information about the acquisition of the log information, but is not limited thereto. In addition, in the description of the following embodiments of the invention, in some cases, "log data" has a format in which information required to transmit the log information from the pseudo-base station to the display device is added to the log header.

The pseudo-base station 51 and the pseudo-base station 52 are connected to the mobile communication terminal 70, which is a test target, through a coupler 60 by a coaxial cable. An RF signal is used as a signal which flows through the coaxial cable. However, when the mobile communication terminal 70 is not tested, but a chipset thereof is tested, the RF signal is not used, but a baseband digital IQ signal may be used.

The coupler 60 couples and distributes signals which are transmitted and received between the mobile communication terminal 70 and the pseudo-base stations 51 and 52. However, an antenna may be provided in the mobile communication terminal 70, and the mobile communication terminal 70 and the pseudo-base station 51 or the pseudo-base station 52 may be connected (spatially coupled) by RF signals, without using the coupler 60 and the coaxial cable.

The mobile communication terminal 70 corresponds to one or two or more communication systems. Examples of the communication system include Global System for Mobile Communications (GSM (registered trademark)), Wideband-Code Division Multiple Access (W-CDMA), Code Division Multiple Access 2000 (CDMA2000), Long Term Evolution (LTE), Evolution Data Only (EVDO), Time Division Synchronous Code Division Multiple Access (TD-SCDMA), and LTE-Advanced.

The pseudo-base stations 51 and 52 have the same functions as the actual base station. The pseudo-base stations 51 and 52 have the same hardware configuration and each include a RAM and a CPU, which will be described in detail below. The RAM stores a program required to control one or two or more communication systems of the mobile communication terminal 70, and the pseudo-base stations 51 and 52 communicate with the mobile communication terminal 70 according to any one of the communication systems.

The pseudo-base stations 51 and 52 each include a time generation unit 535 (FIG. 5) which generates time information, and time is adjusted between the pseudo-base stations 51 and 52.

Each of the pseudo-base stations 51 and 52 performs predetermined communication with the mobile communication terminal 70 and acquires log information about the communication, according to a scenario indicating a communication sequence or a test sequence, which will be described in detail below. The communication log information is transmitted to the display device 10 through a relay device 40.

The communication between the mobile communication terminal 70 and the pseudo-base stations 51 and 52 is switched by, for example, handover. For example, when the transmission power of the pseudo-base station 51 is decreased and the transmission power of the pseudo-base station 52 is increased, the communication between the mobile communication terminal 70 and the pseudo-base station 51 is switched to the communication between the mobile communication terminal 70 and the pseudo-base station 52.

The pseudo-base stations 51 and 52 and the relay device 40 are connected to each other by Gigabit Ethernet (GbE (registered trademark)) and the relay device 40 and the display device are connected to each other by GbE. Packet communication using TCP/IP is performed therebetween.

The relay device 40 analyzes communication data transmitted from the mobile communication terminal 70, detects a destination, and transmits the communication data to the display device 10 which is a transmission destination. Therefore, the relay device 40 includes a routing table. For example, a switching hub or a router can be used as the relay device.

The display device 10 includes a display device-side transmission unit 15, a BTS specification information storage unit 16, a BTS information addition unit 14, a log data storage unit 13, a display control unit 12, a display unit 11, and an operation unit 17.

The display device-side transmission unit 15 transmits header information and log data included in a payload in an IP packet which is received from the relay device 40 to each of the BTS specification information storage unit 16 and the BTS information addition unit 14. The BTS specification information storage unit 16 stores BTS specification information. The BTS information addition unit 14 adds BTS identification information input from the BTS specification information storage unit 16 to log information about a communication sequence. The operation unit 17 is operated by the setter or tester of the test system to input predetermined signals to the display control unit 12 and the BTS specification information storage unit 16.

Here, BTS indicates a base terminal station and means the pseudo-base station 51 or the pseudo-base station 52.

When receiving the IP packet including log data of the communication data between the pseudo-base stations 51 and 52 and the mobile communication terminal 70 from the relay device 40, the display device-side transmission unit 15 transmits the log data included in the payload of the IP packet to the BTS information addition unit 14 and transmits the header information of the IP packet to the BTS specification information storage unit 16.

The BTS specification information storage unit 16 stores a table indicating the correspondence between the IP address of the transmission source of the IP packet and the numbers (#1 and #2) of the pseudo-base stations. The IP address and the numbers for identifying the pseudo-base stations which are stored in the table are input in advance by the operation unit 17.

FIG. 2 shows an example of the table. In the table, the BTS identification information is "1" when the IP address is 192.168.0.1 and the BTS identification information is "2" when the IP address is 192.168.0.2.

Since the IP addresses of the pseudo-base stations 51 and 52 are 192.168.0.1 and 192.168.0.2, respectively, "1" and "2" of the BTS identification information indicates the numbers #1 and #2 of the pseudo-base stations 51 and 52, respectively.

When receiving the header information of the IP packet from the display device-side transmission unit 15, the BTS specification information storage unit 16 checks the address of the transmission source included in the header information and determines whether the IP address corresponds to "1" or "2" of the BTS identification information with reference to the table.

For example, during a communication test between the mobile communication terminal 70 and the pseudo-base station 51, when the BTS specification information storage unit 16 receives the header information of the IP packet from the pseudo-base station 51, the BTS specification information storage unit 16 determines that the address of the transmission source of the IP packet is 192.168.0.1 and determines that the IP address corresponds to "1" of the BTS identification information with reference to the table.

Then, the BTS specification information storage unit 16 transmits the determined BTS identification information to the BTS information addition unit 14.

In addition, a TCP/IP port number field is provided in the table and a port number can be used to distinguish log information communication and other communications. When the distinguishment is performed during the transmission of the log information from the display device-side transmission unit 15 to the BTS information addition unit 14, the TCP/IP port number field can be omitted. In this case, the display device-side transmission unit 15 may transmit only the address of the transmission source included in the header information to the BTS specification information storage unit 16.

The content of the table can be changed by an input from the operation unit 17 when the IP address of the pseudo-base station is changed and when the BTS identification information is changed.

The IP address is an identification number in a network layer for identifying an apparatus on a network which transmits and receives packets according to a TCP/IP protocol and is called a logical address.

In this embodiment, the IP address is represented by 32 bits in IPv4 and is represented by the decimal system for convenience of display in the specification. However, this is an illustrative example, and the IP address may be represented by 128 bits in IPv6.

When receiving the log data included in the payload of the IP packet from the display device-side transmission unit 15, the BTS information addition unit 14 also receives the BTS identification information corresponding to the transmission address of the IP packet from the BTS specification information storage unit 16, as described above.

The BTS information addition unit 14 adds the log data to the BTS identification information. This will be described in detail below.

FIG. 3 shows the format of the log data extracted from the IP packet which is transmitted from the pseudo-base stations 51 and 52 to the display device-side transmission unit 15 through the relay device 40.

As shown in FIG. 3, the log data includes a log header and inter-layer communication data. The log header includes ID information, time information, a transmission source layer, a destination layer, channel information, a primitive name, and a log data length.

An ID in the log data indicates a code for identifying the log data. The time information indicates a log acquisition time or a log generation time. The transmission source layer and the destination layer indicate layers which become a transmission source and a destination in a protocol stack.

The protocol stack has a hierarchical structure of PHY, MAC, RLC, PDCP, and RRC, which will be described in detail below. The primitive name is a name for identifying control information in inter-layer communication. The log data length indicates the length of the log data.

FIG. 4 shows the log data to which the BTS identification information is added by the BTS information addition unit 14. As shown in FIG. 4, "1" or "2" of BTS identification information is added in front of the ID information of the log header.

The log data storage unit 13 stores the log data to which the BTS identification information is added by the BTS information addition unit 14.

The display control unit 12 rearranges or collects the log information in a predetermined format and displays the log information on the display unit 11, in response to the operation of the tester input from the operation unit 17. For example, when log data is collectively displayed as a sequence log, the log data having the BTS identification information added thereto is collected and arranged in chronological order as show in FIG. 7, or log data having the BTS identification information added thereto is grouped and displayed horizontally as shown in FIG. 8, which will be described in detail below.

Figure 5:
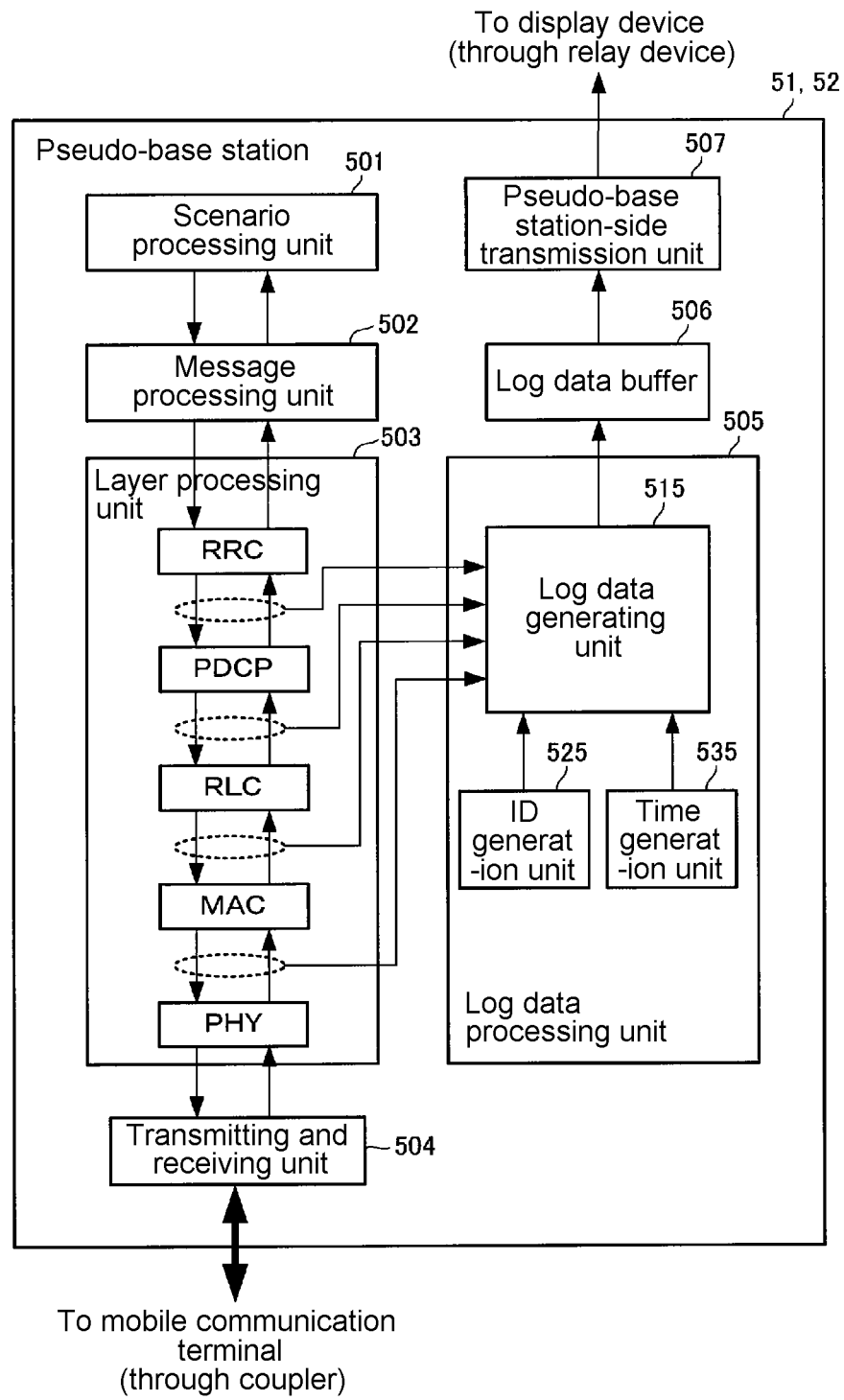
FIG. 5 is a block diagram illustrating an example of the pseudo-base station of the test system shown in FIG. 1.

FIG. 5 shows the schematic structure of the pseudo-base stations 51 and 52. The pseudo-base stations 51 and 52 have the same structure. In the following description, it is assumed that, even when the pseudo-base stations 51 and 52 are separately described, they mean one pseudo-base station.

The pseudo-base stations 51 and 52 each include a scenario processing unit 501, a message processing unit 502, a layer processing unit 503, a transmitting and receiving unit 504, a log data processing unit 505, a log data buffer 506, and a pseudo-base station-side transmission unit 507.

The scenario processing unit 501 stores plural types of scenarios in which a sequence of protocol messages based on a communication protocol for performing various tests for the mobile communication terminal 70 is described.

The scenario processing unit 501 selects a predetermined scenario and controls each unit including the message processing unit 502 of the pseudo-base stations 51 and 52 according to the selected scenario. The message processing unit 502 generates a message to be transmitted to the mobile communication terminal 70, transmits the message to the layer processing unit 503, and processes the message received from the mobile communication terminal 70 through the layer processing unit 503, under the control of the scenario processing unit 501.

The layer processing unit 503 has a protocol stack. The protocol stack has a hierarchical structure of a physical layer (PHY), a media access control layer (MAC), a radio link control layer (RLC), a packet data convergence protocol layer (PDCP), and a radio resource control layer (RRC) from the lower layer to the upper layer.

The protocol stacks from the lower layer to the upper layer are operatively associated with each other to communicate with the mobile communication terminal 70 according to the scenario, on the basis of instructions from the layer processing unit 503.

Each of the layers forming the protocol stack of the layer processing unit 503 will be described in detail below. The PHY modulates and demodulates communication data which is transmitted to and received from the mobile communication terminal 70. In addition, the PHY performs, for example, multiplexing, channel coding, and diffusion in order to transmit and receive communication data.

The MAC performs control in order to effectively use radio resources and performs data conversion between the PHY, which is the lower layer, and the RLC, PDCP, and RRC, which are the upper layers. The RLC performs control operations, such as flow control, bad data processing, and data retransmission, between the pseudo-base station and the mobile communication terminal 70.

The PDCP performs, for example, a secret protection process, a validity check process, a reordering process, and a header compression. The RRC performs, for example, a process of setting a radio bearer which is a virtual connection established in a radio section between the pseudo-base station and the mobile communication terminal 70 and, for example, a process of notifying system information and call information from the network to the mobile communication terminal 70.

The layer processing unit 503 performs a cooperative operation between the layers to control the transmission and reception of communication data in the protocol corresponding to the communication system, extracts a communication sequence and communication content as the log information, and inputs the communication sequence and the communication content to a log data generation unit 515 of the log data processing unit 505, which will be described below.

The transmitting and receiving unit 504 performs encoding, modulation, and frequency conversion on the communication data from the layer processing unit 503 to generate RF signals and transmits the RF signals to the mobile communication terminal 70. In addition, the transmitting and receiving unit 504 receives the RF signals from the mobile communication terminal 70, performs frequency conversion, demodulation, and decoding on the received RF signals, and transmits the RF signals to the layer processing unit 503.

The log data processing unit 505 includes the log data generation unit 515, an ID generation unit, and a time generation unit 535.

The log data generation unit 515 acquires the log information extracted between the layers of the layer processing unit 503 during communication between the pseudo-base stations 51 and 52 and the mobile communication terminal 70 and generates log data to be transmitted to the display device 10 on the basis of the log information.

The ID generation unit 525 generates an ID to be described in the log header of the log data. For example, consecutive numbers corresponding to the log data which is generated in chronological order may be used as the ID.

The time generation unit 535 generates time data. The time data is used as time information when log information is acquired or generated or it is used to adjust time between the pseudo-base stations 51 and 52.

The pseudo-base station-side transmission unit 507 incorporates the log data generated by the log data generation unit 515 into an IP packet and transmits the IP packet to the display device 10 through the relay device 40.

The log data buffer 506 temporarily stores the log data generated by the log data generation unit 515 before the pseudo-base station-side transmission unit 507 transmits the log data to the display device 10.

Figure 6:
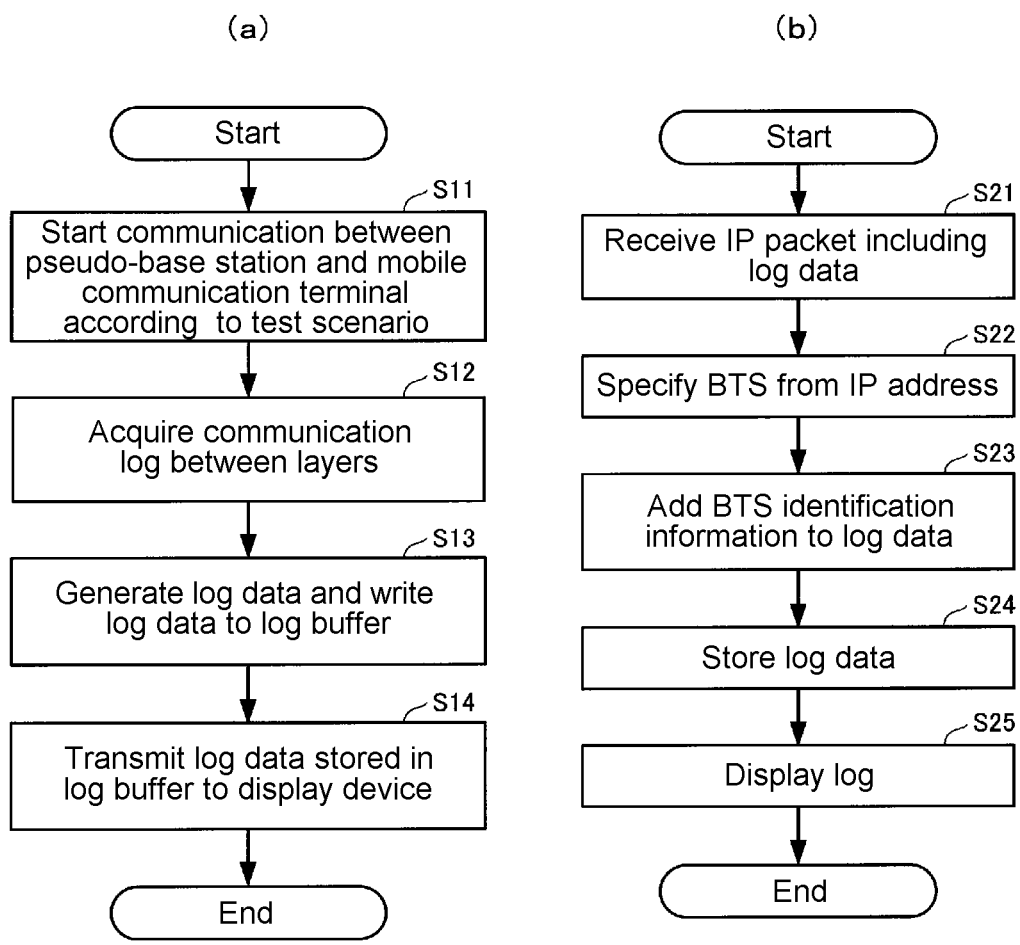
FIG. 6 is a flowchart illustrating the operation of the test system according to the embodiment of the invention which acquires communication log information and displays the log information on the display device.

Next, the operation of the test system 100 until the log information of the communication data is displayed on the display unit 11 of the display device 10 after communication between the mobile communication terminal 70 and the pseudo-base station 51 starts will be described with reference to FIG. 6.

First, the scenario processing unit 501 of the pseudo-base station 51 reads a predetermined scenario from plural types of scenarios in which a sequence of the stored protocol messages is described according to the content of the test for the mobile communication terminal 70 and instructs the message processing unit 502 to process the message according to the scenario.

The message processing unit 502 transmits and receives the message to and from the layer processing unit 503 on the basis of the scenario. The layer processing unit 503 controls the operation of each protocol stack in response to the control. The transmitting and receiving unit 504 transmits and receives RF signals to and from the mobile communication terminal 70. In this way, communication between the pseudo-base station 51 and the mobile communication terminal 70 starts (Step S11).

When the communication between the pseudo-base station 51 and the mobile communication terminal 70 starts, communication between the layers is performed according to each protocol of the layer processing unit 503. The layer processing unit 503 extracts the sequence and content of the communication between the layers as the log information during the communication. The log data generation unit 515 acquires the log information which is extracted between the layers of the layer processing unit 503 (Step S12).

The log data generation unit 515 adds the number generated by the ID generation unit 525 and the time generated by the time generation unit 535 to the log header of the acquired log information to generate log data and writes the generated log data to the log data buffer 506 (Step S13).

The pseudo-base station-side transmission unit 507 incorporates the log data written to the log data buffer 506 into a data portion (payload) of the IP packet. In addition, the pseudo-base station-side transmission unit 507 writes the IP addresses of the pseudo-base stations 51 and 52 as the address of the transmission source to a header portion of the IP packet, writes 192.168.0.9, which is the IP address of the display device 10, as the destination address to the header portion, and transmits the IP packet to the relay device 40.

The relay device 40 transmits the IP packet to the display device 10 (Step S14).

In this way, the operation of the pseudo-base station apparatus 51 transmitting the IP packet including the log data from the pseudo-base station apparatus 51 to the display device 10 ends.

In the display device 10, the display device-side transmission unit 15 receives the IP packet (Step S21). The display device-side transmission unit 15 transmits the header information and the log data included in the payload in the IP packet to the BTS information addition unit 14 and the BTS specification information storage unit 16.

The BTS specification information storage unit 16 specifies the BTS identification information from the IP address of the transmission source in the received IP packet with reference to the table indicating the correspondence between the IP address and the BTS identification information (Step S22).

Then, since the IP address of the pseudo-base station 51 is 192.168.0.1, the BTS specification information storage unit 16 specifies "1" from the BTS identification information field with reference to the table shown in FIG. 2.

The BTS specification information storage unit 16 transmits the specified BTS identification information to the BTS information addition unit 14.

The BTS information addition unit 14 adds the BTS identification information to the log data. For example, the BTS information addition unit 14 writes "1" to the BTS identification information field on the left end of the log header of the log data shown in FIG. 4 (Step S23).

The log data having the BTS identification information added thereto is stored in the log data storage unit 13 (Step S24).

Then, the display control unit 12 reads the log data stored in the log data storage unit 13, sorts the log data, and arranges the log data having the same BTS identification information added thereto in chronological order or groups the log data having the same BTS identification information added thereto, in response to an operation instruction which is input from the operation unit 17 by the tester. Then, the display control unit 12 displays the sorted log information on the display unit 11 (Step S25).

Figure 7:
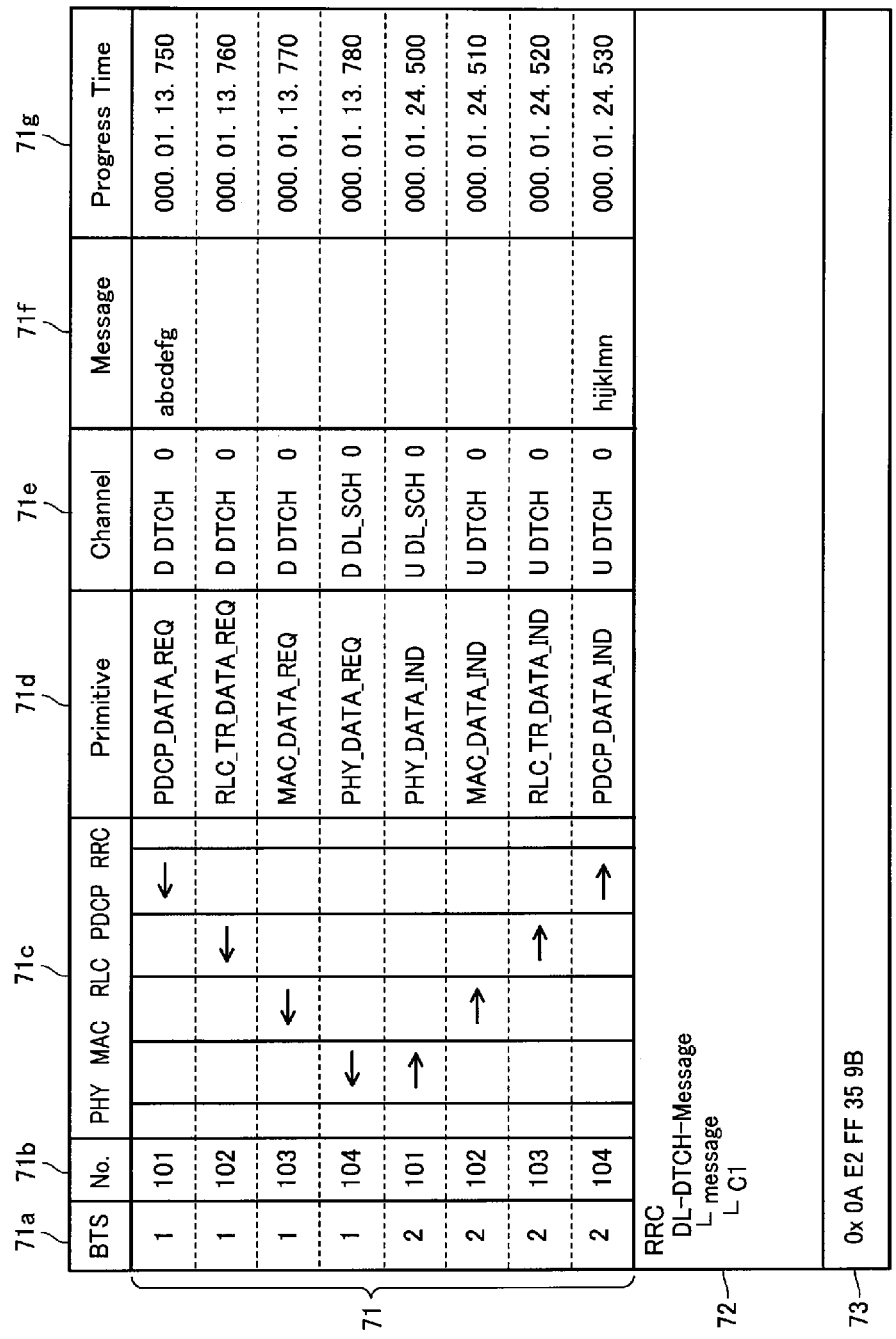
FIG. 7 is a diagram illustrating an example of the communication log information displayed on the display device by the operation of the display device shown in the flowchart of FIG. 6(b).
Figure 8:
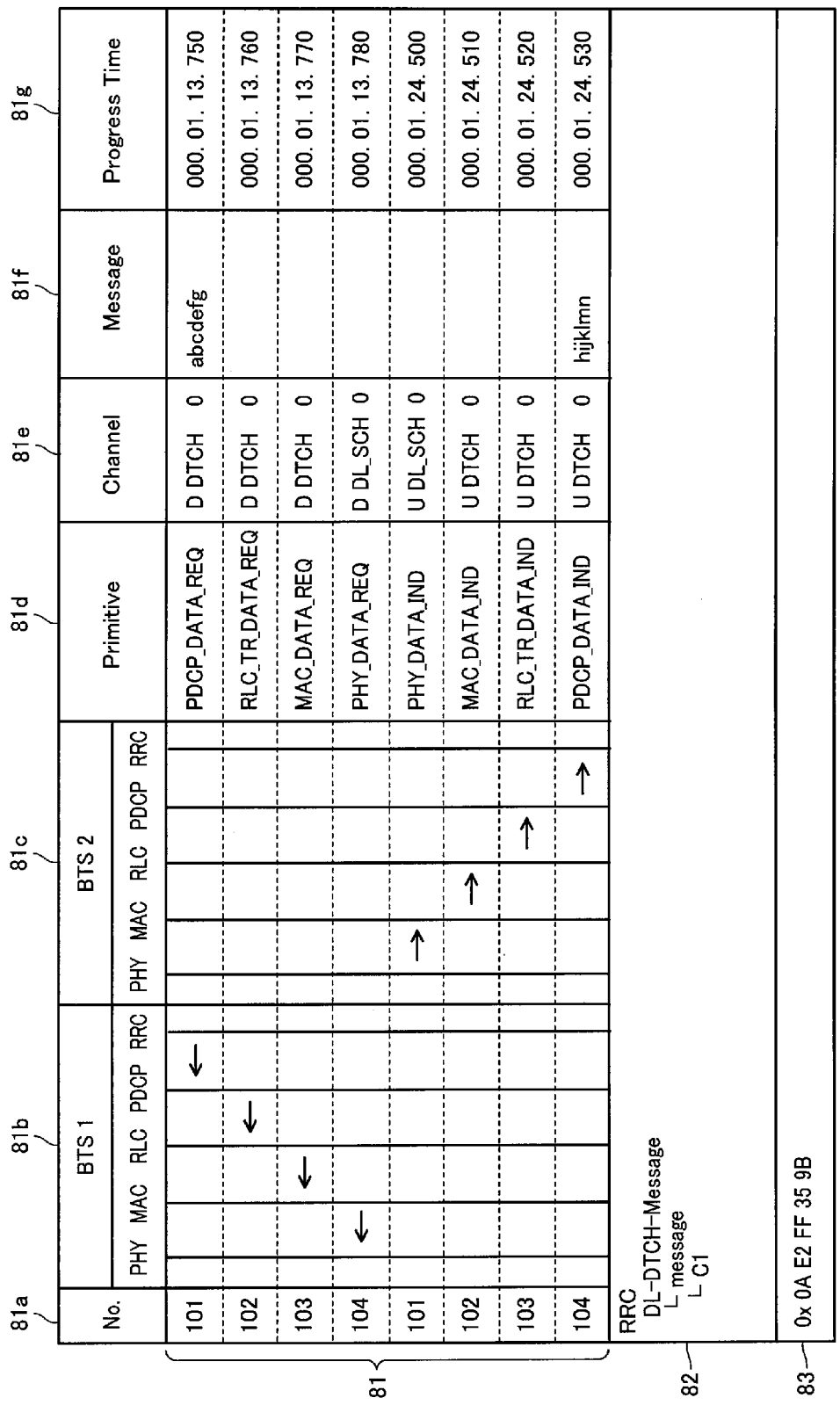
FIG. 8 is a diagram illustrating another example of the communication log information displayed on the display device by the operation of the display device shown in the flowchart of FIG. 6(b).

FIGS. 7 and 8 show an example of a list of the log information displayed on the display unit 11.

The list shown in FIG. 7 includes a log information field 71 in which each log information item is arranged in chronological order, the log information items are divided into two groups according to the BTS identification information, and the two groups are arranged in the vertical direction, a field 72 which indicates content obtained by performing text conversion on log information in a row selected from the field 71, and a field 73 in which the log information in the selected row is represented by a hexadecimal number.

The field 71 shown in FIG. 7 is a row of "BTS" 71*a* indicating the BTS identification information, "No." (number) 71*b*, "PHY MAC RLC PDCP RRC" 71*c* indicating each layer of the protocol of the layer processing unit 503, "Primitive" 71*d* indicating the control information of the communication between the layers, "Channel" 71*e* indicating the type of channel, "Message" 71*f* indicating the type of message, and "Progress Time" 71*g* indicating time information.

In the Primitive 71*d*, for example, "REQ" indicates a request and "IND" indicates a response.

In the list shown in FIG. 8, the log information in each layer of the protocol is horizontally arranged and collectively displayed for each BTS identification information item. The list includes a log information field 81, a field 82 indicating content obtained by converting the log information in a row selected from the field 81 into text, and a field 83 in which the log information in the selected row is represented by a hexadecimal number.

The display device 10 according to the above-described embodiment adds the BTS identification information to the log data so as to correspond to the IP address of the pseudo-base station, which makes it possible to identify the pseudo-base station which transmits the log information.

Therefore, even when a structure capable of identifying the pseudo-base station is not included in the log data transmitted from the pseudo-base station, it is possible to determine the log data related to the communication between the pseudo-base station and the mobile communication terminal 70. Therefore, when log information is displayed on the display device 10, it is possible to collectively display the log information for each pseudo-base station.

Figure 9:
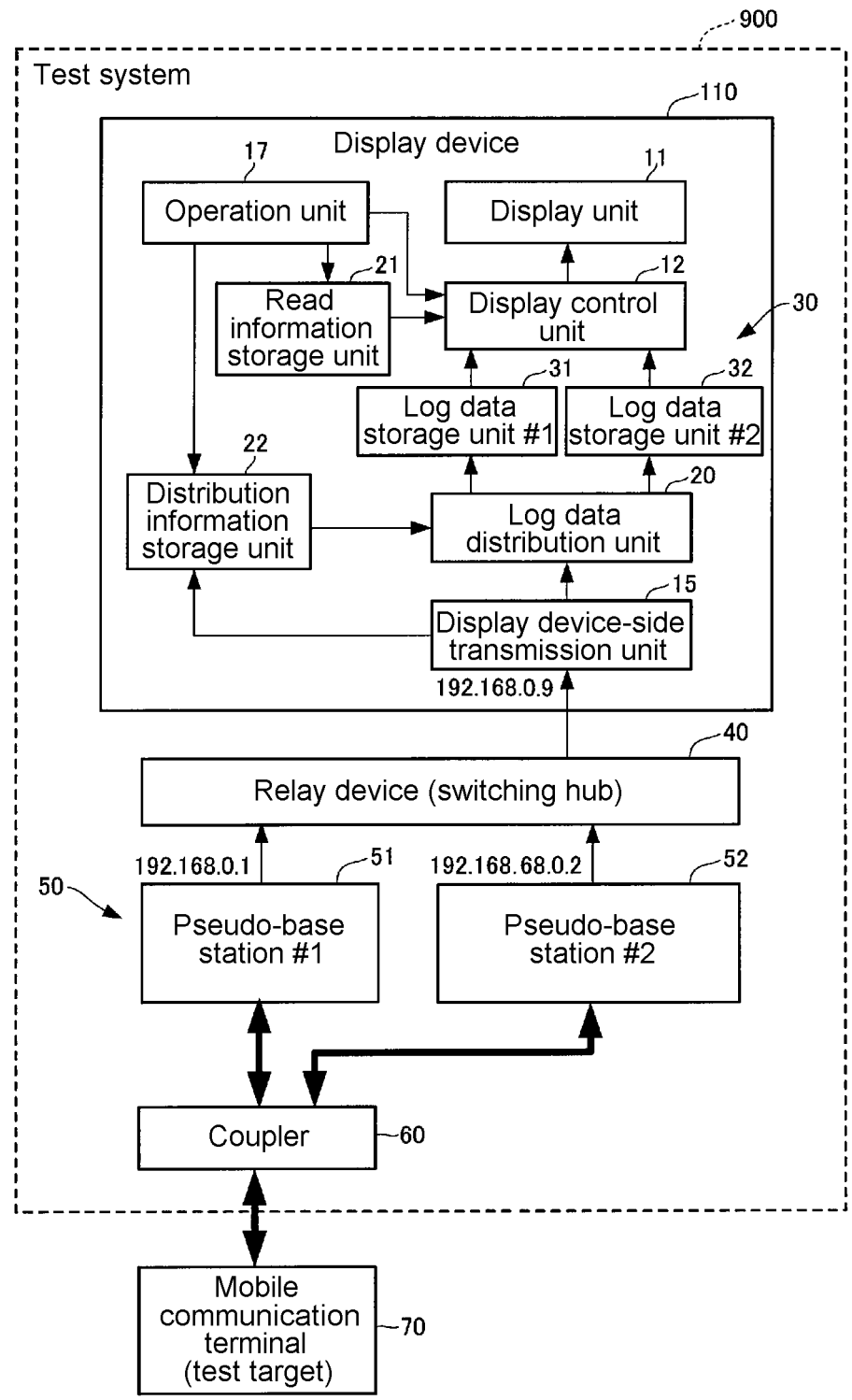
FIG. 9 is a block diagram illustrating a test system according to another embodiment of the invention.

FIG. 9 is a block diagram illustrating a test system 900 according to another embodiment of the invention. In the test system 900 shown in FIG. 9, components denoted by the same reference numerals as those in the test system 100 shown in FIG. 1 have the same functions and the description thereof will not be repeated.

In the test system 900 according to this embodiment, when a display device 110 transmits an IP packet including log data from pseudo-base stations 51 and 52, first, the log data is identified on the basis of a difference in the IP address and is stored in each storage unit. Then, the same BTS identification information is added to the log data stored in each storage unit. Therefore, it is possible to determine whether each log data item is the communication data of the same pseudo-base station.

Specifically, the test system 900 includes the display device 110. The display device 110 includes a display device-side transmission unit 15, a distribution information storage unit 22, a log data distribution unit 20, a log data storage unit 30 including a log data storage unit 31 (#1) and a log data storage unit 32 (#2), a display control unit 12, a read information storage unit 21, a display unit 11, and an operation unit 17.

The display device-side transmission unit 15 transmits header information and log data included in a payload of an IP packet transmitted from a relay device 40 to the distribution information storage unit 22 and the log data distribution unit 20. It is assumed that the distribution information storage unit 22 stores distribution information in advance.

The distribution information storage unit 22 reads the IP address of a transmission source from the header information of the received IP packet. In addition, the distribution information storage unit 22 stores a predetermined table and determines the distribution destination of the log data on the basis of the table. That is, the distribution information storage unit 22 determines whether to store the log data in the log data storage unit 31 or the log data storage unit 32. Then, the distribution information storage unit 22 transmits distribution information indicating the distribution destination to the log data distribution unit 20.

FIG. 10 shows an example of the table stored in the distribution information storage unit 22. The table indicates the relationship between the distribution destination and the IP address of the transmission source of the IP packet received from the display device-side transmission unit 15. The distribution destination is storage unit #1 (log data storage unit 31) and storage unit #2 (log data storage unit 32).

For example, in the table, when the IP address of the transmission source of the IP packet is 192.168.0.1, the distribution destination is determined to be storage unit #1, that is, the log data storage unit 31. In addition, in the table, when the IP address of the transmission source of the IP packet is 192.168.0.2, the distribution destination is determined to be storage unit #2, that is, the log data storage unit 32.

The log data distribution unit 20 stores the received log data in the log data storage unit 31 or the log data storage unit 32 on the basis of distribution information indicating the distribution destination which is input from the distribution information storage unit 22.

When the distribution information storage unit 22 inputs distribution information indicating that the distribution destination of the log data is storage unit #1 to the log data distribution unit 20 on the basis of the example of the table shown in FIG. 10, the log data distribution unit 20 stores the log data in the log data storage unit 31.

The read information storage unit 21 has a predetermined table. FIG. 11 shows an example of the table. In the example, storage unit #1 (log data storage unit 31) and storage unit #2 (log data storage unit 32), which are read sources, correspond to "1" and "2" of the BTS identification information, respectively.

The content of the table is input from the read information storage unit 21 to the display control unit 12. When the log data is read from the log data storage unit 31 or the log data storage unit 32, the display control unit 12 attaches the BTS identification information corresponding to the storage units to the log data with reference to the table. As a result, the same BTS identification information is attached to the log data read from the same storage unit.

The display control unit 12 sorts or arranges the log data on the basis of the BTS identification information to make a predetermined list of log information. For example, as shown in FIG. 7 or FIG. 8, the display control unit 12 sorts the log data having the same BTS identification information attached thereto in chronological order or groups the log data having the same BTS identification information attached thereto.

Then, the display control unit 12 displays the log information on the display unit 11.

Figure 12:
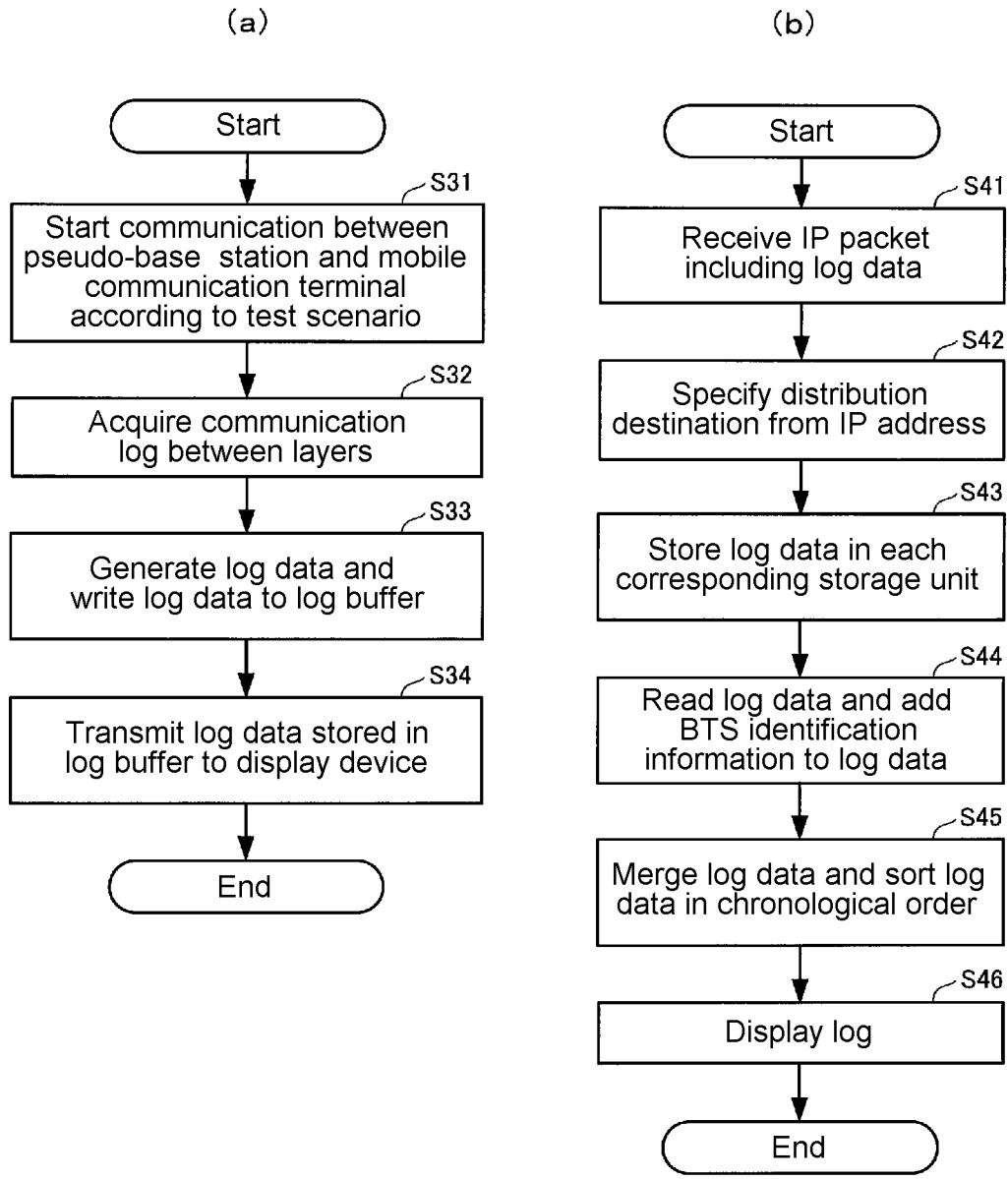
FIG. 12 is a flowchart illustrating the operation of the test system shown in FIG. 9 which acquires communication log information and displays the log information on the display device.

Next, the operation of the test system 900 until the log information of communication data is displayed on the display unit 11 of the display device 110 after communication between the mobile communication terminal 70 and, for example, the pseudo-base station 51 starts will be described with reference to FIG. 12.

First, the scenario processing unit 501 of the pseudo-base station 51 reads a predetermined scenario from plural types of scenarios in which a sequence of the stored protocol messages is described according to the content of the test for the mobile communication terminal 70 and instructs the message processing unit 502 to process the message according to the scenario.

The message processing unit 502 transmits and receives the message to and from the layer processing unit 503 on the basis of the scenario. The layer processing unit 503 controls the operation of each protocol stack in response to the control. The transmitting and receiving unit 504 transmits and receives RF signals to and from the mobile communication terminal 70. In this way, communication between the pseudo-base station 51 and the mobile communication terminal 70 starts (Step S31).

When the communication between the pseudo-base station 51 and the mobile communication terminal 70 starts, communication between the layers is performed according to each protocol of the layer processing unit 503. The layer processing unit 503 extracts the sequence and content of the communication between the layers as the log information during the communication. The log data generation unit 515 acquires the log information which is extracted between the layers of the layer processing unit 503 (Step S32).

The log data generation unit 515 adds the number generated by the ID generation unit 525 and the time generated by the time generation unit 535 to the log header of the acquired log information to generate log data and writes the generated log data to the log data buffer 506 (Step S33).

The pseudo-base station-side transmission unit 507 incorporates the log data written to the log data buffer 506 into a data portion (payload) of the IP packet. In addition, the pseudo-base station-side transmission unit 507 writes the IP addresses of the pseudo-base stations 51 and 52 as the transmission addresses to a header portion of the IP packet, writes 192.168.0.9, which is the IP address of the display device 110, as the destination address to the header portion, and transmits the IP packet to the relay device 40.

The relay device 40 transmits the IP packet to the display device 110 (Step S34).

In this way, the operation of the pseudo-base station apparatus 51 transmitting the IP packet including the log data from the pseudo-base station apparatus 51 to the display device 110 ends.

In the display device 110, the display device-side transmission unit 15 receives the IP packet (Step S41). The display device-side transmission unit 15 transmits the header information and the log data included in the payload in the IP packet to the log data distribution unit 20 and the distribution information storage unit 22.

The distribution information storage unit 22 reads the IP address of the transmission source from the IP packet and specifies a distribution destination with reference to the table indicating the correspondence between the IP address and the distribution destination (Step S42).

Since the IP address of the pseudo-base station 51 is 192.168.0.1, the distribution information storage unit 22 specifies the distribution destination of the log data included in the payload of the IP packet to be storage unit #1 (log data storage unit 31) with reference to the table shown in FIG. 10.

The distribution information storage unit 22 transmits a signal indicating the specified distribution destination to the log data distribution unit 20.

The log data distribution unit 20 stores the log data in the log data storage unit 31 or the log data storage unit 32 on the basis of the signal indicating the distribution destination which is received from the distribution information storage unit 22 (Step S43).

In the above-mentioned example, since the distribution information storage unit 22 specifies the distribution destination of the log data to be storage unit #1, the log data is stored in the log data storage unit 31.

Then, the read information storage unit 21 inputs data for the table indicating the correspondence between storage unit #1 and storage unit #2 which store the log data and "1" and "2" of the BTS identification information to the display control unit 12.

When the log data is read from the log data storage unit 31 or the log data storage unit 32, the display control unit 12 attaches the BTS identification information corresponding to each storage unit to the log data on the basis of the content of the table (Step S44).

For example, when the log data is read from the log data storage unit 31 (storage unit #1), the display control unit 12 attaches "1" of the BTS information to the header portion of the log data with reference to the table. As a result, the same BTS identification information is attached to the log data read from the same storage unit.

Then, the display control unit 12 sorts the log data in response to an operation instruction which is input from the operation unit 17 by the tester and arranges the log data having the same BTS identification information attached thereto in chronological order or groups the log data having the same BTS identification information attached thereto, on the basis of the BTS identification information attached to the log data (Step S45).

Then, the display control unit 12 displays the sorted log information on the display unit 11 (Step S46). For example, the display unit 11 can display the same log information list as that shown in FIG. 7 or FIG. 8. In this way, the log data display operation of the display device 110 ends.

According to the invention, it is possible to provide a mobile communication terminal test system which includes a plurality of pseudo-base stations, can appropriately collect log information about the operation of each of the plurality of pseudo-base stations while distinguishing the log information, and can display the log information about the operation of each of the plurality of pseudo-base stations such that the pseudo-base stations can be identified and a method of displaying the log information in the test system.

DESCRIPTION OF REFERENCE NUMERALS AND SIGNS

10: DISPLAY DEVICE
11: DISPLAY UNIT
12: DISPLAY CONTROL UNIT
13: LOG DATA STORAGE UNIT
14: BTS INFORMATION ADDITION UNIT (IDENTIFICATION INFORMATION ADDITION UNIT)
15: DISPLAY DEVICE-SIDE TRANSMISSION UNIT
16: BTS SPECIFICATION INFORMATION STORAGE UNIT (PSEUDO-BASE STATION SPECIFICATION INFORMATION STORAGE UNIT)
20: LOG DATA DISTRIBUTION UNIT
21: READ INFORMATION STORAGE UNIT
22: DISTRIBUTION INFORMATION STORAGE UNIT
31, 32: LOG DATA STORAGE UNIT
40: RELAY DEVICE
51, 52: PSEUDO-BASE STATION (PSEUDO-BASE STATION APPARATUS)
60: COUPLER
70: MOBILE COMMUNICATION TERMINAL
100, 900: TEST SYSTEM
501: SCENARIO PROCESSING UNIT (SCENARIO CONTROL UNIT)
502: MESSAGE PROCESSING UNIT (SCENARIO CONTROL UNIT)
503: LAYER PROCESSING UNIT
505: LOG DATA PROCESSING UNIT
506: LOG DATA BUFFER
507: PSEUDO-BASE STATION-SIDE TRANSMISSION UNIT
515: LOG DATA GENERATION UNIT
525: ID GENERATION UNIT
535: TIME GENERATION UNIT

What is claimed is:

1. A mobile communication terminal test system comprising:
a plurality of pseudo-base station apparatuses each of which simulates an operation of a base station, communicates with a mobile communication terminal, which is a test target, according to a communication protocol including a plurality of layers, performs a process of each of the plurality of layers during the communication, generates log data including communication data between the layers, and transmits a packet including the log data; and
a display device that is connected to the pseudo-base station apparatuses through a network, receives the packet transmitted from each of the pseudo-base station apparatuses, and displays a communication log between the layers on a display unit on the basis of the log data included in the packet,
wherein the display device includes:
an information storage unit that stores information associated with an addresses of each of the plurality of pseudo-base station apparatuses on the network in advance;
a log data storage unit that stores the log data such that the pseudo-base station apparatus which has performed the communication can be identified, on the basis of the information stored in the information storage unit; and
a display control unit that displays the log on the display unit such that the pseudo-base station apparatus which has performed the communication can be identified, on the basis of the log data stored in the log data storage unit.

2. The mobile communication terminal test system according to claim 1,
wherein the information storage unit is a pseudo-base station specification information storage unit that stores pseudo-base station specification information in which identification information for identifying each of the plurality of pseudo-base station apparatuses is associated with the addresses of the plurality of pseudo-base station apparatuses on the network in advance,
the display device further includes an identification information addition unit that, when receiving the packet including the log data from each of the plurality of pseudo-base station apparatuses, specifies the pseudo-base station apparatus which has generated the log data with reference to the address of a transmission source of the packet and the pseudo-base station specification information and adds the identification information of the specified pseudo-base station apparatus to the log data, and
the display control unit displays the log on the display unit such that the pseudo-base station apparatus which has performed the communication can be identified, on the basis of the identification information having the log data added thereto.

3. The mobile communication terminal test system according to claim 1,
wherein the display device includes a plurality of the log data storage units that are provided so as to correspond to the plurality of pseudo-base station apparatuses,
the information storage unit is a distribution information storage unit that stores distribution information in which distribution destination information for specifying each of the plurality of log data storage units is associated with the addresses of the plurality of pseudo-base station apparatuses on the network in advance,
the display device further includes:
a log data distribution unit that, when receiving the packet including the log data from each of the plurality of pseudo-base station apparatuses, specifies the log data storage unit which will store the log data with reference to the address of a transmission source of the packet and the distribution information and stores the log data in the specified log data storage unit; and
a read information storage unit that stores read information in which read source information for specifying each of the plurality of log data storage units is associated with identification information for identifying each of the plurality of pseudo-base station apparatuses in advance, and the display control unit displays the log on the display unit such that the pseudo-base station apparatus which has performed the communication can be identified, on the basis of the log data and the read information read from each of the plurality of log data storage units.

4. The mobile communication terminal test system according to claim 1,
wherein the display control unit can be switched between a state in which the display control unit sorts the log in an order of time indicated by time information which is included in the log data and displays the sorted log and a state in which the display control unit sorts the log for each pseudo-base station apparatus which has performed the communication and displays the sorted log.

5. The mobile communication terminal test system according to claim 1,
wherein the plurality of pseudo-base station apparatuses include a first pseudo-base station apparatus and a second pseudo-base station apparatus,
handover or inter-RAT which changes a communication destination of the mobile communication terminal from the first pseudo-base station apparatus to the second pseudo-base station apparatus is performed, and
the display control unit displays the logs of the first pseudo-base station apparatus and the second pseudo-base station apparatus as a series of logs.

6. A mobile communication terminal test method comprising:
a step of allowing a plurality of pseudo-base station apparatuses, each of which simulates an operation of a base station, to communicate with a mobile communication terminal, which is a test target, according to a communication protocol including a plurality of layers, and to perform a process of each of the plurality of layers during the communication;
a step of allowing each of the plurality of pseudo-base station apparatuses to generate log data including communication data between the layers;
a step of allowing each of the plurality of pseudo-base station apparatuses to transmit a packet including the log data;
a step of allowing a display device, which is connected to the plurality of pseudo-base station apparatuses through a network, to receive the packet transmitted from each of the pseudo-base station apparatuses;
a step of allowing the display device to display a communication log between the layers on the basis of the log data included in the packet;
a step of storing information which is associated with an address of each of the plurality of pseudo-base station apparatuses on the network in advance; and
a step of storing the log data such that the pseudo-base station apparatus which has performed the communication can be identified, on the basis of the information,
wherein the display step displays the log such that the pseudo-base station apparatus which has performed the communication can be identified, on the basis of the stored log data.

7. The mobile communication terminal test method according to claim 6,
wherein the storage step stores pseudo-base station specification information in which identification information for identifying each of the plurality of pseudo-base station apparatuses is associated with the addresses of the plurality of pseudo-base station apparatuses on the network in advance,
the test method further includes a step of, when the display device receives the packet including the log data from each of the plurality of pseudo-base station apparatuses, specifying the pseudo-base station apparatus which has generated the log data with reference to the address of a transmission source of the packet and the pseudo-base station specification information and adding the identification information of the specified pseudo-base station apparatus to the log data, and
the display step displays the log such that the pseudo-base station apparatus which has performed the communication can be identified, on the basis of the identification information having the log data added thereto.

8. The mobile communication terminal test method according to claim 6,
wherein the storage step stores distribution destination information for specifying each of a plurality of log data storage units, which are provided in the display device so as to correspond to the plurality of pseudo-base station apparatuses, and the addresses of the plurality of pseudo-base station apparatuses on the network in advance so as to be associated with each other,
the test method further includes:
a step of storing read source information for specifying each of the plurality of log data storage units and pseudo-base station specification information for specifying each of the plurality of pseudo-base station apparatuses to a read information storage unit in advance so as to be associated with each other; and
a step of, when the display device receives the packet including the log data from each of the plurality of pseudo-base station apparatuses, specifying the log data storage unit which will store the log data with reference to the address of a transmission source of the packet and the distribution destination information and storing the log data in the specified log data storage unit, and
the display step displays the log such that the pseudo-base station apparatus which has performed the communication can be identified, on the basis of the log data which is read from each of the plurality of log data storage units and information stored in the read information storage unit.

9. The mobile communication terminal test method according to claim 6,
wherein the display step can switch between a state in which the log is sorted in an order of time indicated by time information which is included in the log data and the sorted log is displayed and a state in which the log is sorted for each pseudo-base station apparatus which has performed the communication and the sorted log is displayed.

10. The mobile communication terminal test method according to claim 6,
wherein the plurality of pseudo-base station apparatuses include a first pseudo-base station apparatus and a second pseudo-base station apparatus,
handover or inter-RAT which changes a communication destination of the mobile communication terminal from the first pseudo-base station apparatus to the second pseudo-base station apparatus is performed, and
the display step displays the logs of the first pseudo-base station apparatus and the second pseudo-base station apparatus as a series of logs.

* * * * *